United States Patent [19]
Burke, Jr. et al.

[11] Patent Number: 5,555,267
[45] Date of Patent: Sep. 10, 1996

[54] FEEDFORWARD CONTROL SYSTEM, METHOD AND CONTROL MODULE

[76] Inventors: George E. Burke, Jr., 9412 S. Merc Ct., Raleigh, N.C. 27615; George M. Horne, 106 Exeter Ct., Cary, N.C. 27511; Michael B. Carter, 1921 Strebor St., Durham, N.C. 27705

[21] Appl. No.: 99,788

[22] Filed: Jul. 30, 1993

[51] Int. Cl.⁶ .................................................. H04J 3/00
[52] U.S. Cl. ...................... 370/85.1; 340/825.62
[58] Field of Search .................. 370/112, 94.3, 370/13, 17, 67, 124, 85.1, 85.2, 58.1, 58.2, 58.3, 67, 68, 124, 77, 85.91, 85.11, 94.1, 94.2, 95.1, 95.2, 95.3; 340/825.03, 825.02, 825.8, 825.83, 825.87, 825.06, 825.56, 825.65, 825.62; 318/562, 590

[56] References Cited

U.S. PATENT DOCUMENTS

| | | | |
|---|---|---|---|
| 4,504,943 | 3/1985 | Nagano et al. | 370/112 |
| 4,593,390 | 6/1986 | Hildebrand et al. | 370/112 |
| 4,808,994 | 2/1989 | Riley | 340/825.57 |
| 5,050,167 | 9/1991 | Izadpanah | 370/112 |
| 5,072,446 | 12/1991 | Berry | 370/112 |
| 5,200,647 | 4/1993 | Motoike | 370/112 |
| 5,239,546 | 8/1993 | Hayashi | 370/112 |
| 5,243,599 | 9/1993 | Barrett et al. | 370/112 |

*Primary Examiner*—Benedict V. Safourek
*Assistant Examiner*—Dang Ton
*Attorney, Agent, or Firm*—Michael J. Femal; Larry T. Shrout; Larry I. Golden

[57] ABSTRACT

A control system (FIGS. 2, 3, 5, 6) and method in which multiple levels, or stages (128, 130, 132), of logical decisions are made by selectively feedforwarding output signals (356) from control modules (72) to the inputs of other modules (80), preferably through use of control modules (233) with selective feedforwarding circuits (239, 240) to logically combine during selected synchronous time slots (351) of a synchronous clock signal (FIG. 11) the result of a plurality of nonconcurrent input signals from a plurality of input devices (28, 30, 32, 34) to control an output device (26).

31 Claims, 12 Drawing Sheets

FEEDFORWARD CONTROL SYSTEM, METHOD AND CONTROL MODULE

BACKGROUND OF THE INVENTION

1. Field of the Invention

This invention relates generally to the field of control systems and, more particularly, to multilevel, multi-input combinational logic control systems using a serial multiplex bus.

2. Description of the Related Art Including Information Disclosed Under 37 CFR 1.97–1.99

Control systems employing a time-division serial multiplex bus for controlling at least one output device by a plurality of input devices are well known. An example is shown and described in U.S. Pat. No. 4,808,994 issued Feb. 28, 1989, to Riley which is incorporated by reference into this application. Such known control systems use the bus as a wired-OR and use control modules with logical circuits associated with each input and each output device. It is also well known in such control systems for a plurality of the input devices to act together in a preselected combinational scheme to control one or more output devices. Such combinational schemes are representable by means of Boolean algebra and are illustratable by means of interconnections of four basic logic operations or logic gates: AND, OR, NOR, and NAND gates. The electronic activation of selected inverter circuits associated with the inputs and outputs of the control modules allow the wired-OR of the bus to selectively function equivalently as any one of the four logical operations.

In control systems using a serial multiplex bus, simultaneous connection to the bus of a plurality of input devices via control modules yields a single logic stage output logically responsive to the inputs. In known control systems, integrated, two-channel control modules are provided with an internal logical gate connection between an output of each channel to produce a third output to form a second logic stage, or level of combinational logic. This third output in known systems is used only to drive an output device directly without connecting the second stage output to the bus.

In known control systems more than two stages of combinational logic are only obtained by using a host computer or by using more than one bus or multiple nonbus connections. The use of a host computer, more than one bus or multiple nonbus connections defeats the purpose of a single bus control system and disadvantageously adds cost and complexity.

SUMMARY OF THE INVENTION

Accordingly, it is the principle object of the present invention to provide a control system control module and method in which the disadvantages of known control systems are overcome by feedforwarding signals between the control modules to enable more than two levels of logic or more than two inputs to any seconds or subsequent level of logic without the need for a host computer or multiple bus or direct line connections and a control module especially adapted for use in such a multiple control system and method.

The object of the invention is obtained by providing a control system for controlling at least one output device in response to a plurality of input signals comprising means for transferring input signals to a bus from a plurality of control modules at selected times associated with the control modules, and means at one of the plurality of control modules associated with one of the selected times responsive both to an input signal to the one of the plurality of control modules and to the plurality of input signals transferred to the bus by the plurality of control modules to feedforward an output signal to at least one other of the plurality of control modules associated with another of the selected times to control the output device.

Obtainment of the object is also achieved by provision of a method of controlling at least one output device in response to a plurality of input signals, comprising the steps of (a) transferring input signals to a bus from a plurality of control modules at selected times associated with the control modules and (b) feedforwarding an output signal from one of the plurality of control modules associated with one of the selected times, to at least one other of the plurality of control modules associated with another of the selected times to control the output device, the output signal being responsive both to an input signal to the one of the plurality of control modules and to input signals transferred to the bus by the plurality of control modules.

Moreover, the object of the present invention is achieved by providing a control module comprising means for transferring input signals to a bus and means for providing an output signal in response to the input signals and to a logical status of the bus on a selected basis.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
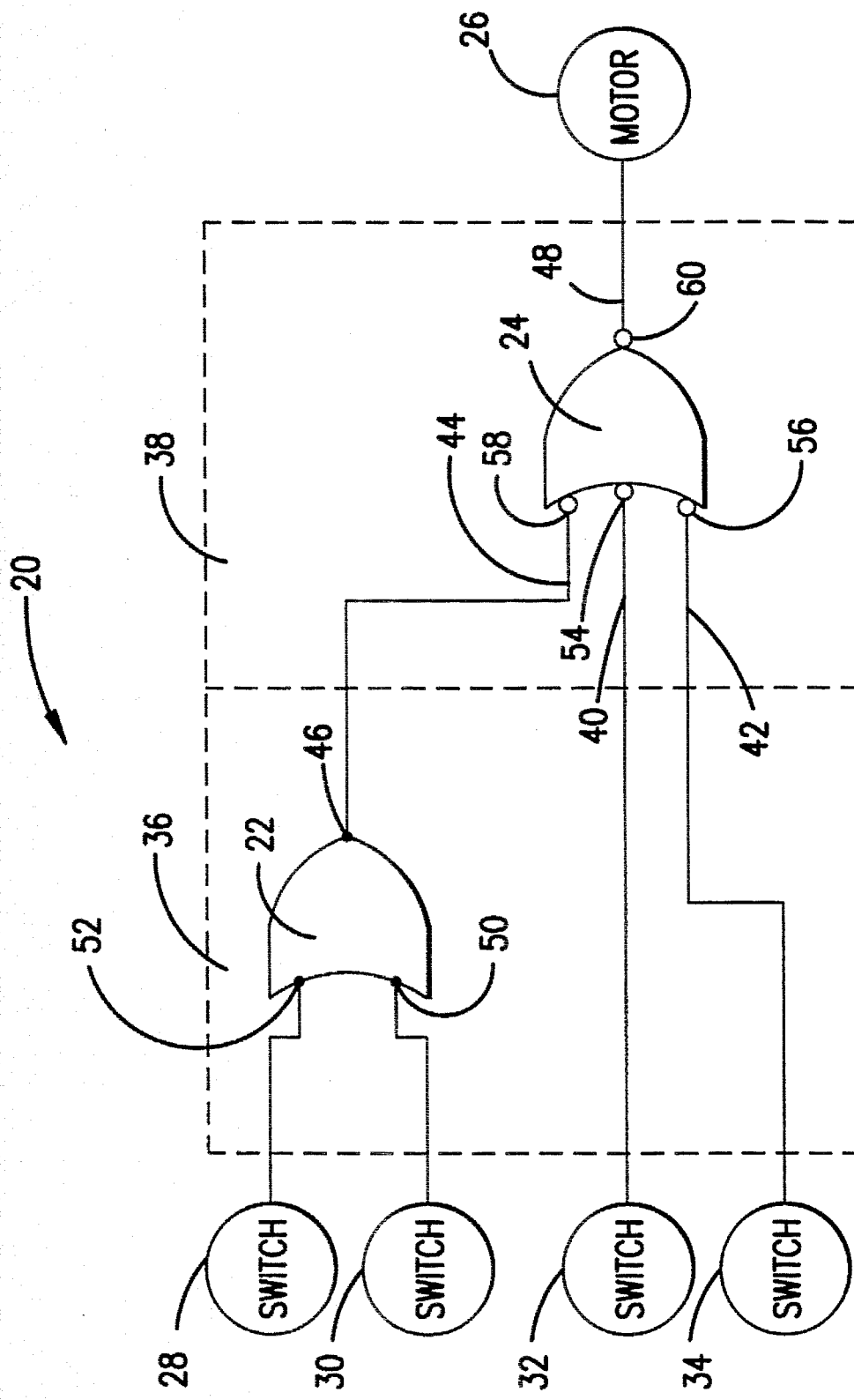
FIG. 1 is a simplified wiring diagram of a typical PRIOR ART control system constructed with logic gates requiring three inputs to a second stage, or level, of logic.

Referring to FIG. 1, a PRIOR ART control system 20 is shown using logic gates 22 and 24 for controlling a motor 26 based upon the position of switches 28, 30, 32 and 34. The system 20 is designed so that the motor 26 will operate when either switches 28 or 30 are closed and switches 32 and 34 are closed. The control system 20 has two logical levels, or stages, 36 and 38. The second logic level 38 has two direct inputs 40 and 42 from switches 32 and 34, respectively, and another input 44 from the output 46 of the first stage 36. Known control modules and a serial multiplex bus like that shown in the aforementioned patent of Riley cannot be used to implement a multilevel combinational logic control circuit having more than two inputs to a second or any subsequent level. Although the circuit 20 of FIG. 1 is alternatively capable of being constructed using only two-input gates, it nevertheless illustrates a logic circuit having a second level with superbinary, or more than two, inputs.

Figure 2:
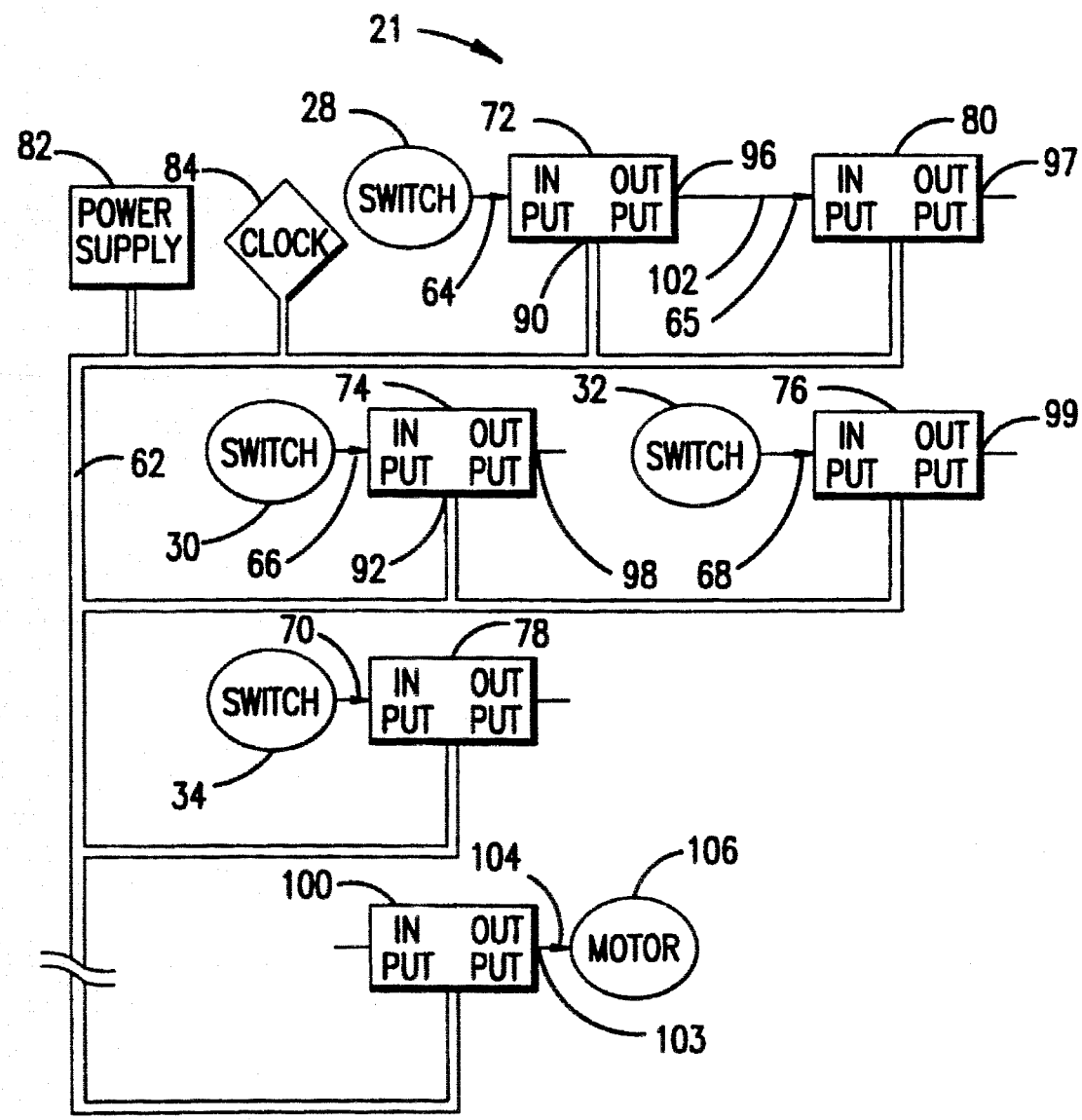
FIG. 2 is a schematic diagram of a preferred embodiment of a control system of the present invention corresponding in logical function to that of FIG. 1 and which is implemented through means of a serial multiplex bus and single channel control modules with feedforwarding connections.
Figure 11:
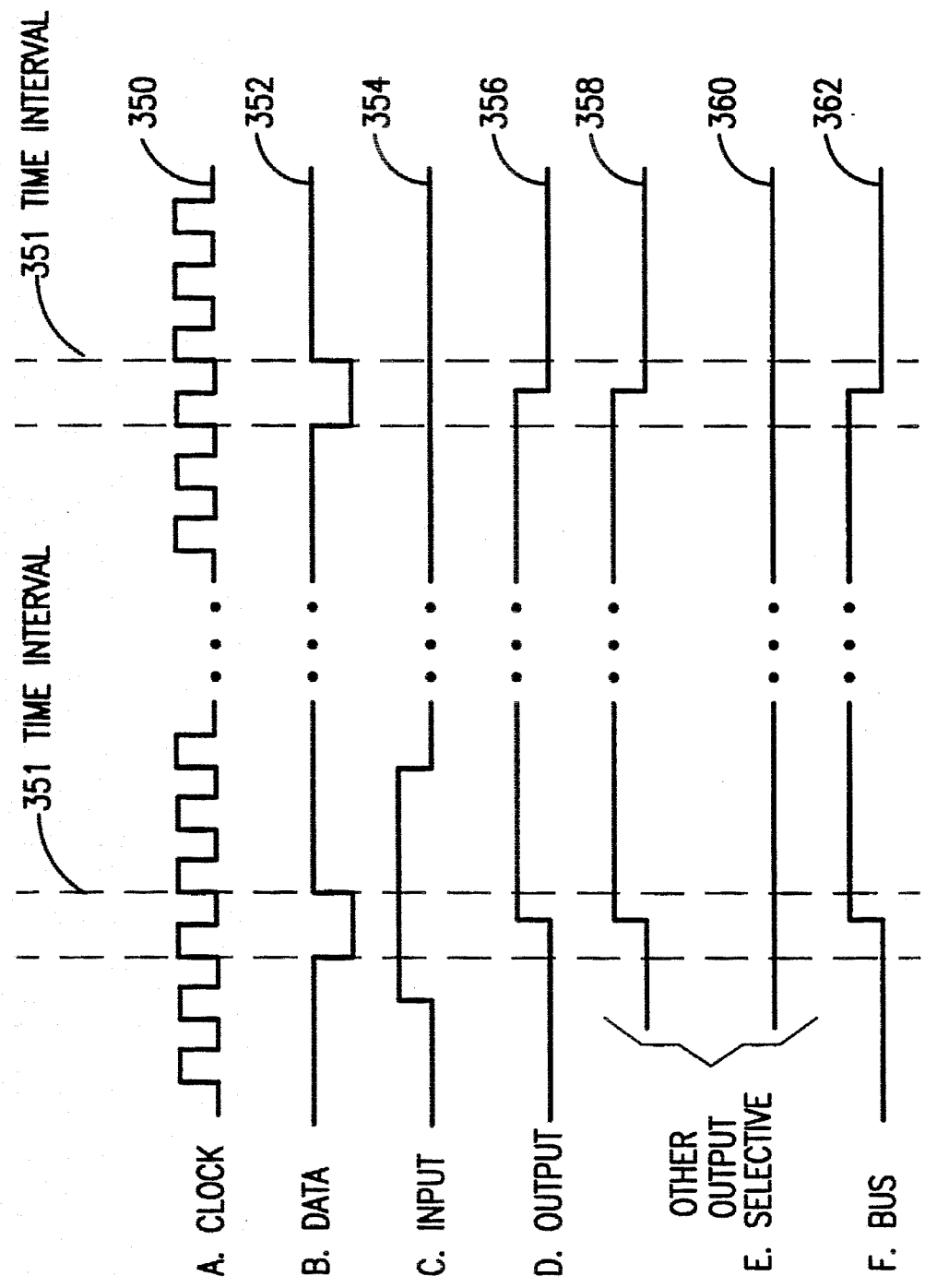
FIG. 11 is a timing diagram of a single-channel control module of the present invention.

Referring now to FIG. 2, a control circuit 21 constructed in accordance with the present invention and designed to implement the same logical functions as those of the control circuit 20 of FIG. 1 is shown using a serial multiplex bus 62. Each input device, in this case, each switch 28, 30, 32 and 34 is connected to the inputs 64, 66, 68 and 70 of separate, but identical, control modules 72, 74, 76 and 78, respectively. A power supply 82 supplies power to all the control modules 72, 74, 76, 78, 80 and 100 and a clock 84 provides synchronous timing signals for the control system 21, as shown in FIG. 11, described below. The control modules 72, 74, 76, 78, 80 and 100 are connected to, and are in time division multiplex communication with, the serial multiplex bus 62. Preferably, there are up to 256 time slots, each time slot being one or two cycles of the clock 84 and the clock operates at a frequency of approximately 10–200 kHz. In this application the terms time slot and time interval are used interchangeably and refer to an address on the multiplex bus 62.

Control modules 72 and 74 are programmed for simultaneous communication with the bus 62 during a selected one of the clock time intervals, or a first time slot. During this first time slot control modules 72 and 74 separately and independently, provide an input signal (not shown) into the bus 62 through bus terminals 90 and 92 of control modules 72 and 74, respectively. All signals are binary, single bit signals. The input signals will be high or low depending upon the position of switches 28 and 30, respectively. As a result of this communication with the bus 62, a signal appears, after the first time slot, at the outputs 96 and 98 of control modules 72 and 74, respectively, in response to the combination of input signals appearing at the inputs 64 and 66 of control modules 72 and 74, respectively.

Referring to the PRIOR ART control system 20 of FIG. 1, the signal on output 96 is functionally equivalent to the output signal of the first logical stage 36 of the PRIOR ART combinational logic circuit 20 of FIG. 1. The signal on output 96 is functionally equivalent to the output signal of a logical OR gate because no inverters are inserted at the inputs 64 and 66 and outputs 96 and 98 of control modules 72 and 74, respectively. On the other hand, a signal (not shown) equivalent to the output of a logical AND gate appears at the outputs 96 and 98, respectively, if inverters (not shown) are inserted at the inputs 64 and 66 and at the outputs 96 and 98 of control modules 72 and 74, respectively.

In order to implement the functions of the remaining portion of the PRIOR ART control system 20, control modules 76, 78 and 100 are programmed for another selected time interval, or second time interval. In addition, control module 80, although not directly connected to an input device or output device, is also programmed for the second time interval.

The functions of inverters 54, 56 and 58 of FIG. 1 are performed internally within each control module of FIG. 2, by means of inverters which are electronically selectively inserted at each of the inputs 65, 68 and 70 of control modules 80, 76 and 78, respectively. The remaining two input devices, switch 32 and switch 34, are connected to the inputs 68 and 70 of control modules 80 and 78, respectively. The signal appearing at the output 96 of control module 72 is the feedforward signal and it is fed into the input 65 of control module 80 by interconnection 102. The function of inverter 60 of FIG. 1 is performed by an inverter electronically connected at the output 104 of control module 100.

In this application, to feedforward a signal means to cause a signal appearing at the output terminal of a single-channel control module associated with a first time interval to appear at the input of another single-channel control module associated with another time interval for logical combination with other signals at a future time interval relative to said first time interval in order to produce multiple stages of combinational logic, each stage effectively having multiple inputs. In the case of a two-channel control module, a signal is feedforwarded when a signal appearing at the output terminal of one of the two channels associated with a first time interval is caused to appear at the input terminal of the other of the two channels associated with a second time interval for use at a future time interval relative to said first time interval in order to produce multiple stages of combinational logic, each stage having multiple inputs.

Control modules 76, 78, 80 and 100 are in simultaneous communication with the bus 62 during the second time interval. Each of the control modules 76, 78, 80 and 100 transfers to the bus 62 during the second time interval the signal present at its input terminal at the beginning of the second time period, as shown in FIG. 11. As a result, an output signal appears after the second time interval at the output 104 of control module 100. Internal inverters (not shown) at the input terminals 65, 68 and 70 of control modules 80, 76 and 78, respectively, and at the output 104 of control module 100, allow these control modules to convert the wired-OR of the bus into an AND gate to perform the function performed by the AND gate 24 of the prior art shown in FIG. 1. A motor 106 is connected to an inverter 103 at the output 104 of control module 100. The motor 106 is activated after the second time interval upon the occurrence of a logical combination of inputs from switches 28, 30, 32 and 34.

Figure 3:
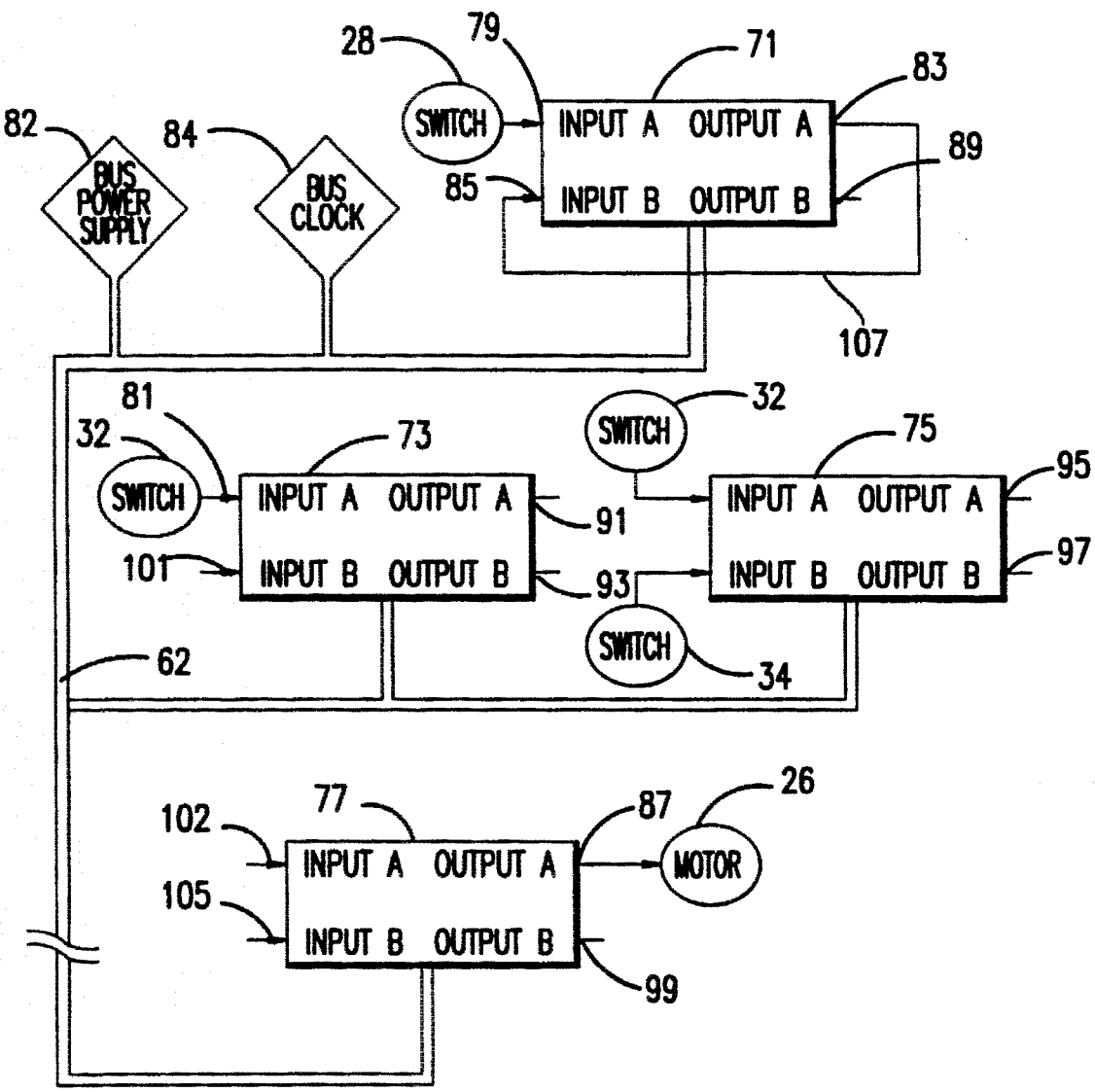
FIG. 3 is a schematic diagram of a preferred embodiment of another control system of the present invention corresponding in logical function to that of FIG. 1 and which is implemented through means of a serial multiplex bus and two channel control modules with feedforwarding connections.

In a manner similar to the control system of FIG. 2, which uses single channel control modules, the PRIOR ART control system of FIG. 1 can also be constructed on a serial multiplex bus using two channels, channels A and B, and control modules 71, 73, 75 and 77, as shown in FIG. 3. Each channel of each module is capable of being programmed for the same or different time interval than the other channel of the control module. Channel A of modules 71 and 73 are programmed for a first time interval. Input signals from switches 28 and 32 are fed into the channel A input terminals 79 and 81 of modules 71 and 73, respectively. After the input signals from switches 28 and 32 are transferred to the bus 62 by modules 71 and 73, respectively, during the first time interval, a first intermediate output signal appears on the channel A output terminal 83 of control module 71.

In known methods of constructing control systems, an output device such as motor 26 is connected directly to the channel A output terminal of a module such as module 71. However, in the method of the invention, the channel A output terminal 83 is connected to the channel B input terminal 85 of module 71 via feedforward path 107 for combination at a future time interval. The intermediate output signal is feedforwarded from output terminal 83 of control module 71 to the input terminal 85 of module 71. This intermediate output signal is equivalent to the intermediate output signal appearing at the output 46 of OR gate 22 in FIG. 1.

Channel B of module 71, channels A and B of module 75, and channel A of module 77 are programmed for a second time interval. After the second time interval, an output signal appears on output terminal 87 of control module 77. This output signal is functionally equivalent to the output signal appearing at the output 48 of AND gate 24 in FIG. 1. In the embodiment of the invention shown in FIG. 3, the control module output terminals 89, 91, 93, 95, 97 and 99 and input terminals 101, 102 and 105 are not utilized due to the relative simplicity of the control circuit; however, the method of the invention allows much more complex control circuits to be implemented, in which case more of the input and output terminals are used.

Alternatively, the method of the invention also allows the motor 26 to be connected to the outputs 91 and 95 of control module 73 and 75, respectively, thereby alleviating the need for a control module 77.

Figure 4:
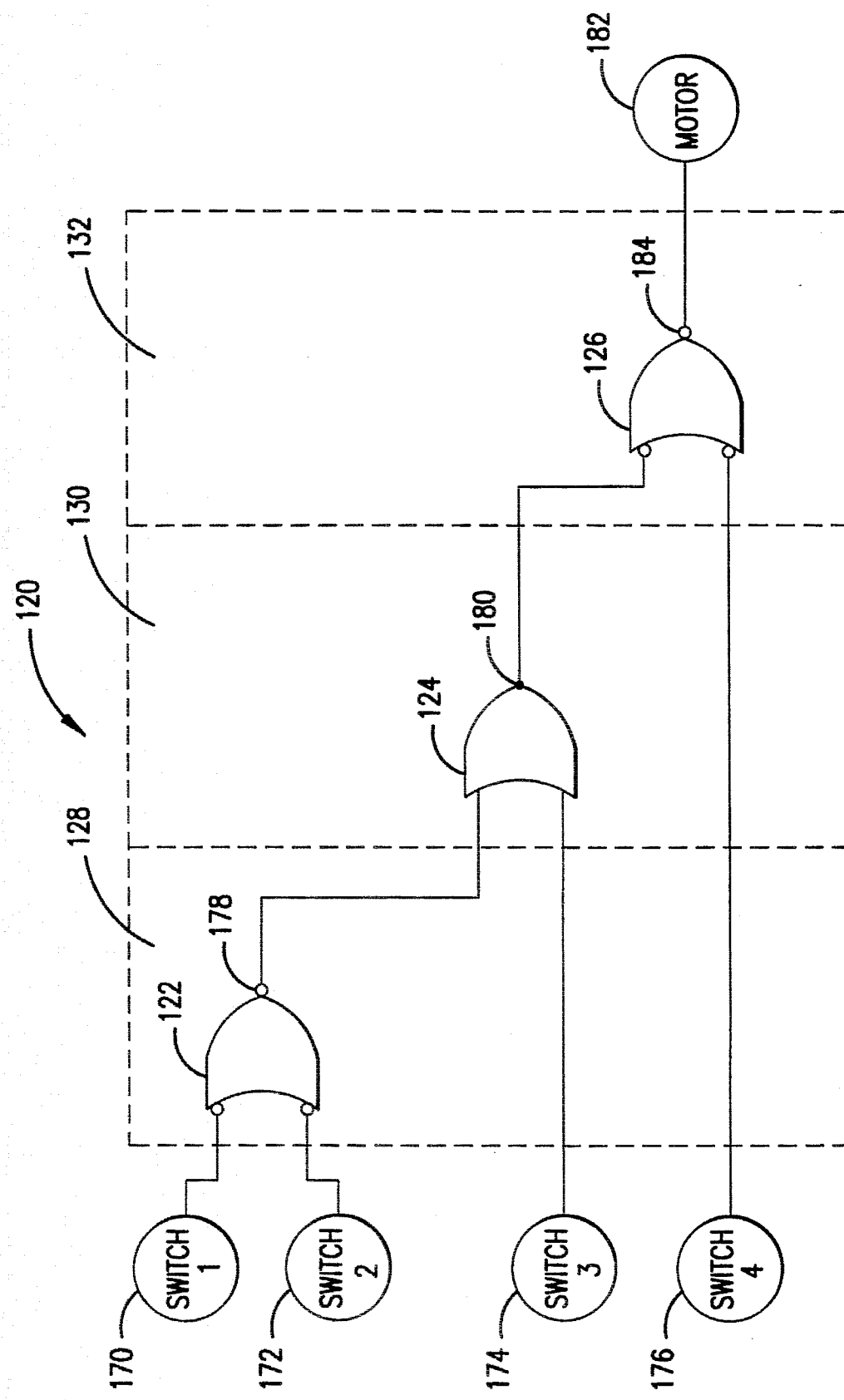
FIG. 4 is a simplified wiring diagram of another typical PRIOR ART control system constructed with logical gates requiring three stages, or levels, of logic.

Referring to FIG. 4, a control system 120 is shown using logical gates 122, 124 and 126. Control system 120 is a three stage combinational logic control system since it has a first stage 128, a second stage 130 and a third stage 132.

Figure 5:
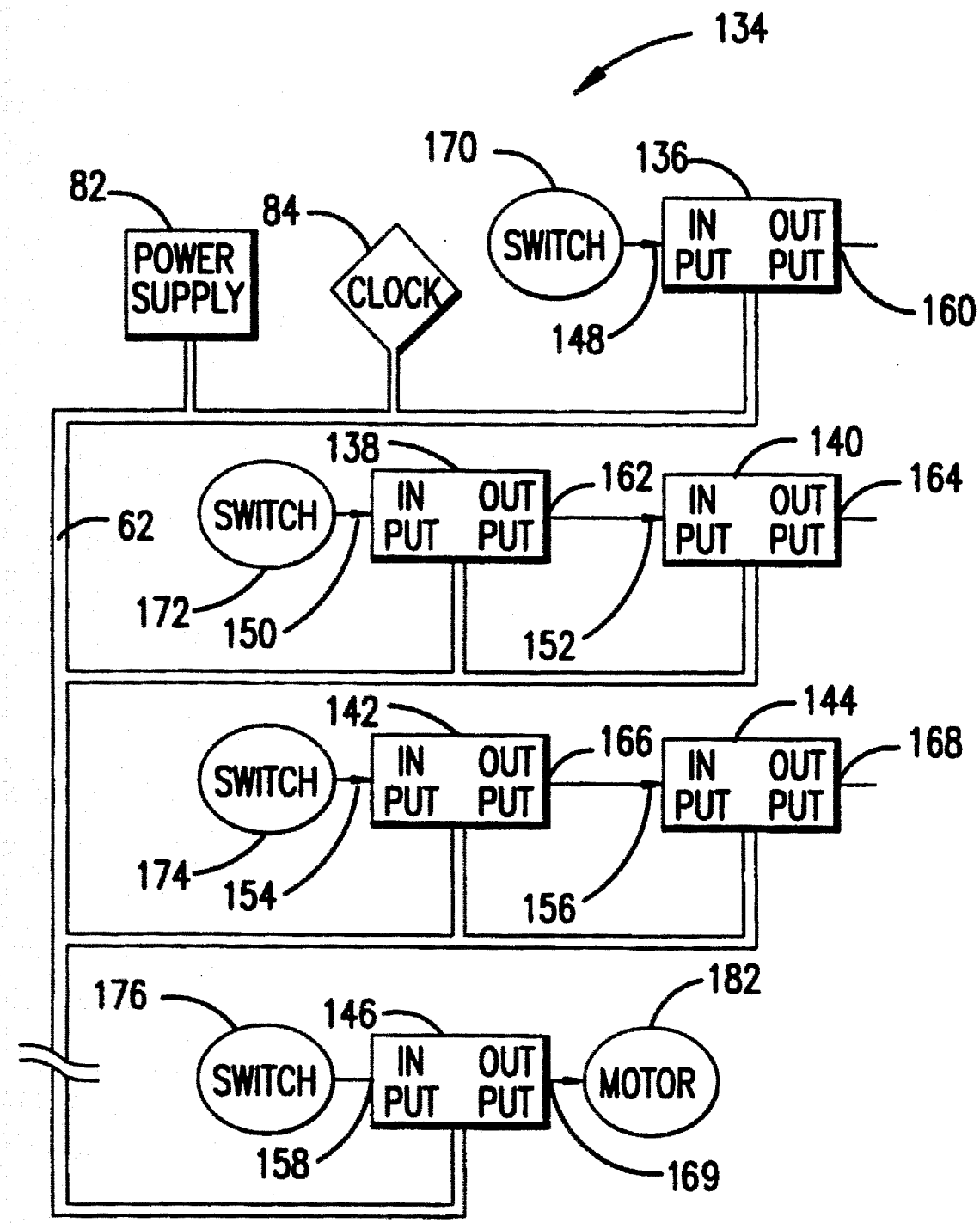
FIG. 5 is a schematic diagram of a preferred embodiment of a another control system of the present invention corresponding in logical function to that of FIG. 4 and which is implemented through means of a serial multiplex bus and single channel control modules with feedforward connections.

Referring to FIG. 5, a control system 134 which performs the same functions as the control system 120 of FIG. 4 is constructed in accordance with the present invention using a serial multiplex bus 62 and six control modules 136, 138, 140, 142, 144 and 146 shown in FIG. 5. Each control module 136, 138, 140, 142, 144 and 146 is in time division multiplex communication with the bus 62. Control modules 136, 138, 140, 142, 144 and 146 have inputs 148, 150, 152, 154, 156 and 158 and outputs 160, 162, 164, 166, 168 and 169, respectively. Each control module is programmed for a selected time interval. An internal inverter (not shown) at the inputs 148 and 150 and outputs 160 and 162 of control modules 136 and 138 are selected by programming, as described in the aforementioned patent of Riley. The input signals from switches 170 and 172 enter control modules 136 and 138 through inputs 148 and 150, respectively, and appear on the bus 62 during the first time interval. Thereafter, a first intermediate output signal responsive to the combination of input signals from switches 170, 172 appears at the outputs 160 and 162 of control modules 136 and 138. A first intermediate output signal appears at control module 138, FIG. 5, which is the intermediate result of the first of the three stages corresponding to stages 128, 130 and 132 of combinational logic of FIG. 4. The first intermediate output signal is fed from control module 138 into the input 152 of control module 140 for use at a future time interval.

Control modules 140 and 142 are programmed for a second time interval. The input signal from switch 174 is fed into the input 154 of control module 142. The first intermediate output signal of control module 140 and the input signal from switch 174 are transferred to the bus during the second time interval. Thereafter, a second intermediate output signal responsive to the logical combination of the signals on the bus during the second time interval appears at the outputs 164, 166 of control modules 140 and 142, respectively. A second intermediate output signal is provided at output 166, FIG. 5, which corresponds to the result of the second stage 130 of the three stages 128, 130 and 132 of the control system 120 of FIG. 4. The second intermediate output signal is fed into the input 156 of control module 144 for use at a later time interval.

Control modules 144 and 146 are programmed for a third time interval to activate internal inverters (not shown) at the inputs 156 and 158 of control modules 144 and 146 and on the output 169 of control module 146. The input signal from switch 176 is fed into the input 158 of control module 146. The second intermediate output signal of control module 144 and the input signal from switch 176 are transferred to the bus during a third time interval by control modules 144 and 146, respectively. Thereafter, an output signal, representative of the combination of the second intermediate output signals and the input signal from switch 176 appears on the output 169 of control module 146. The output signal corresponds to the result of the third stage 132 of control system 120 of FIG. 4, and the output signal is used to activate motor 182.

Figure 6:
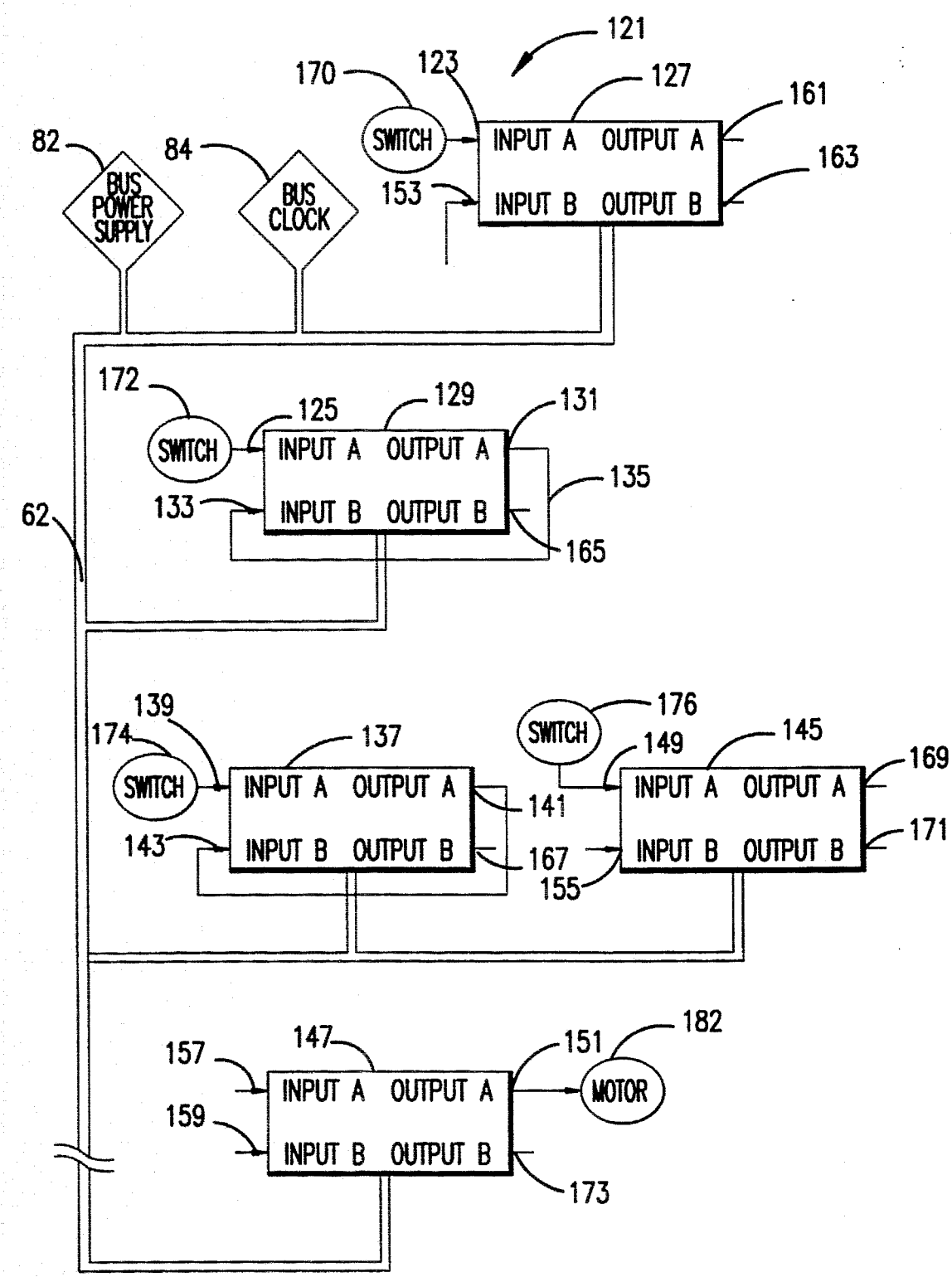
FIG. 6 is a schematic diagram of a preferred embodiment of the control system of the present invention like that of FIG. 4 and which is implemented through means of a serial multiplex bus and two-channel control modules with feedforward connections.

A control circuit 121 functionally equivalent to the prior art control circuit shown in FIG. 4 is shown in FIG. 6 using the method of the invention with the two-channel control modules described by Riley connected to a bus. The prior art control system of FIG. 4 cannot be constructed with the control modules of Riley using prior known methods. Input signals from switches 170 and 172 appear at the input terminals 123 and 125 of channel A of control modules 127 and 129, respectively. Channel A of control module 127 and channel A of control module 129 are both associated with a first time interval. During the first time interval, a first intermediate output signal is produced on the bus 62 from the input signals. After the first time interval, the first intermediate output signal appears on the channel A output terminal 131 of control module 129. The first intermediate output signal is a feedforward signal. The feedforward signal is feedforward from channel A output terminal 131 to channel B input terminal 133 of control module 129 via feedforward path 135 for use at a later time interval. Channel B of control module 129 and channel A of control module 137 are associated with a second time interval. The input signal from switch 174 appears at input terminal 139 of channel A of control module 137. After the second time interval, a second intermediate output signal appears at the output 141 of channel A of control module 137. The second intermediate output signal is feedforwarded from channel A output terminal 141 to channel B input terminal 143 of control module 137. The second intermediate output signal, therefore, is used as another feedforward signal for use at another later time interval. Channel B of control module 137, channel A of control module 145, and channel A of control module 147 are associated with a third time interval. An input signal from switch 176 appears at the input terminal 149 of channel A of control module 145. A motor 182 is connected to the output terminal 151 of channel A of control module 147. After the third time interval, an output signal appears at the output terminal 151 of channel A of control module 147. The output signal is responsive to the logical combination of the input signals from switches 170, 172, 174 and 176. Input terminals 153, 155, 157 and 159 and output terminals 161, 163, 165, 167, 169, 171 and 173 are not utilized. While the motor could have alternatively been connected to output terminals 167 or 169 (which are associated with the same third time interval as output terminal 151), the motor has its own control module because typically an output device is located far from the input devices and cannot conveniently share a control module.

Figure 7:
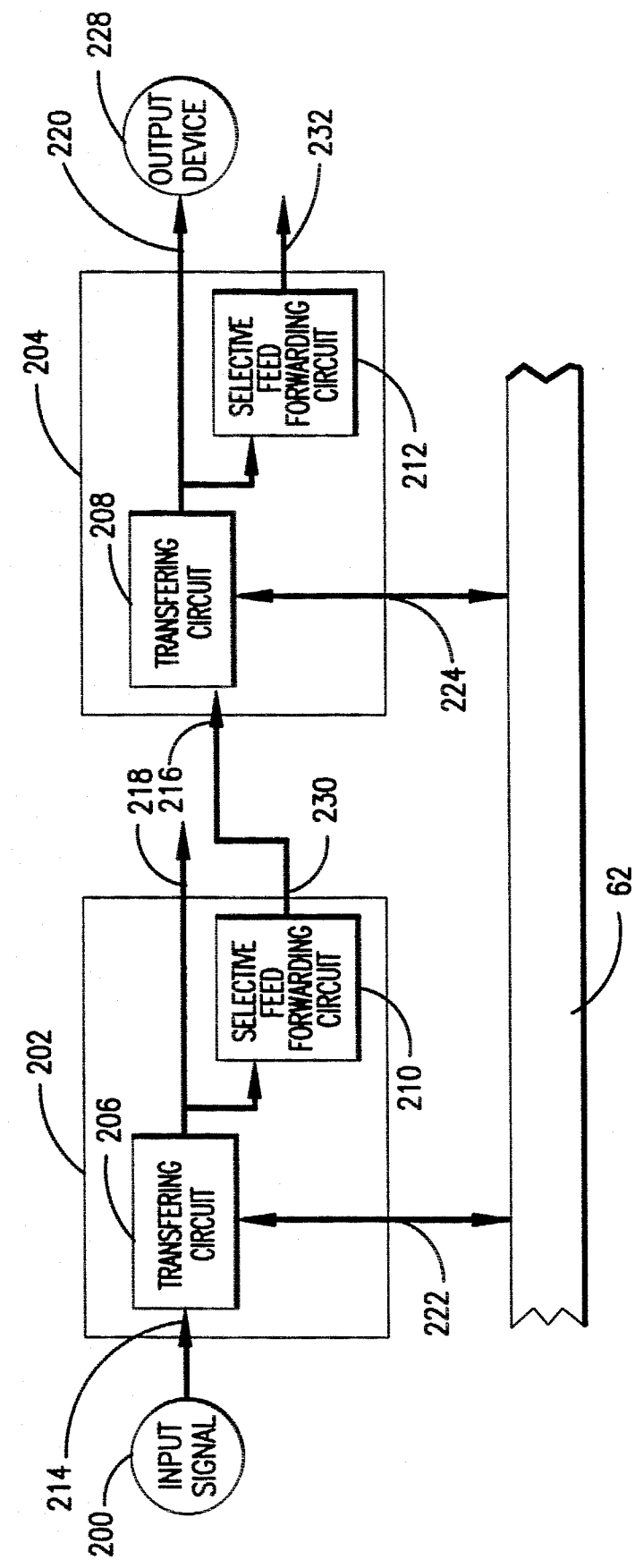
FIG. 7 is a simplified functional block diagram of a preferred embodiment of two single channel control modules of the present invention which have been externally interconnected for selective feedforwarding of output signals of one to the input of the other and shown in FIGS. 2 and 5.

Referring now to FIG. 7, which shows two interconnected single channel control modules 202 and 204. The control modules 202 and 204 have transferring circuits 206 and 208 and a selective feed forwarding circuit means 210 and 212. The control modules 202 and 204 have input terminals 214 and 216, output terminals 218 and 220 and bus terminals 222 and 224, respectively. The bus terminals 222 and 224 are connected to bus 62. The selective feedforwarding circuits such as selective feedforwarding circuit 210 selectively provides an output signal at the input terminal, such as input terminal 216, of another control module 204. Unlike known control modules which merely have one output terminal such as 220 for connection to an output device, such as output device 228, the embodiment of the invention of FIG. 7 has output terminals 230 and 232 for connection to the inputs of other control modules, such as input 216 connected to output 230, as shown.

Figure 8:
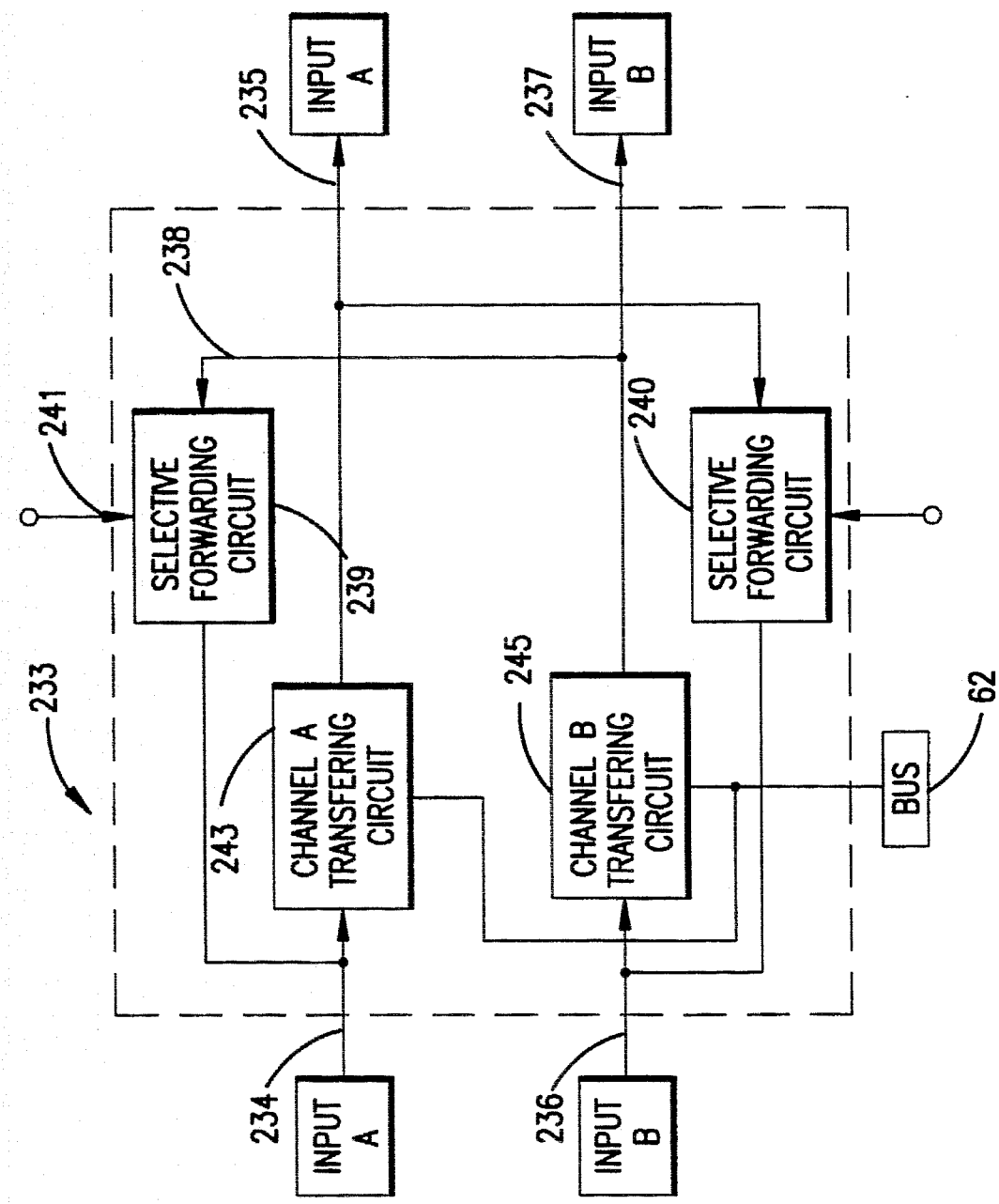
FIG. 8 is a simplified functional block diagram of the preferred embodiment of the two channel control module of the present invention preferably employed in the control system of FIGS. 3 and 6 in which the interconnections between channels is internal and selectively controlled in response to external control signals.

FIG. 8 shows a preferred embodiment of the control module 233 of the invention which has two channels, channel A and channel B. The control module 233 has an input terminal 234 for receiving channel A input signals and an output terminal 235 at which appears channel A output signals. Similarly, control module 233 has a channel B input terminal 236 and a channel B output terminal 237 at which appears channel B output signals. A feedforwarding path 238 is selectively provided through selective feedforwarding circuit 239 from the output 237 of channel B to the input 234 of channel A. Preferably, an EEPROM receives an external output 241 to determine whether feedforwarding is selected. In the event that the selective feedforwarding circuits 239 and 240 do not feedforward input signals from channel B to the input terminal of channel A, and vice-versa, the control module of FIG. 8 operates like prior known control modules, as described in Riley. However, activating at least one of the selective feedforward circuits 239 and 240 allows the output of one of the two channels to be used for logically combining with the other input signals received at a later time slot for use in constructing more complicated control systems than with prior known methods. A channel A transferring circuit 243 and a channel B transferring circuit 245 comprise timing and logic circuits for transferring input and output signals to and from the bus 62 that are well known to those skilled in the art of control modules for serial multiplex bus control systems. Reference should be made to the aforementioned U.S. patent of Riley. Each of the transferring circuits 243 and 245 are associated with a preselected time slot of the plurality of time slots of a synchronous cycle. In order to obtain the advantages of the invention, the channel A transferring circuit 243 is associated with one time slot and the channel B transferring circuit 245 is associated with a different time slot. Preferably, the feedforwarding path provided by the selective feedforwarding circuit is contained entirely within the two-channel control module 233. The channels A and B transferring circuits 243 and 245 shown in FIG. 8 are like those shown in more detail in FIG. 10 and described in the aforementioned patent of Riley.

Figure 9:
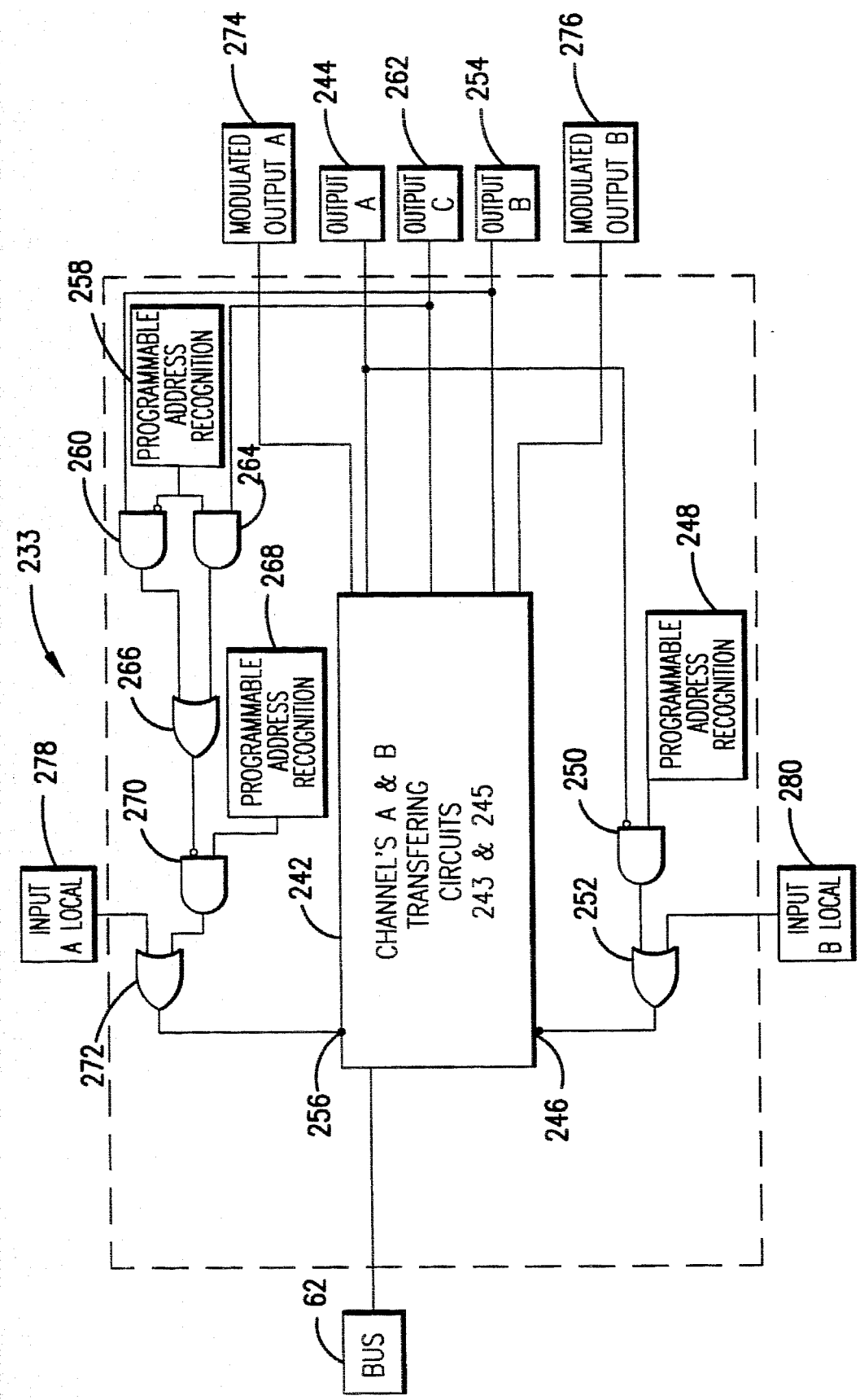
FIG. 9 is a more detailed functional block diagram of the preferred embodiment of the two channel control module of the present invention shown in FIG. 8.

Referring now to FIG. 9, The output signal from the output 244 of channel A to the input 246 of channel B is selectively provided by means including a programmable address recognition circuit 248 and an AND gate 250 connected to the output 244 of channel A. The AND gate 250 is connected to the input 246 of channel B via an OR gate 252. A local B input 280 is also connected to OR gate 252. In a similar manner, the output 254 of channel B is selectively feedforward to the input 256 of channel A. Output 254 of channel B is connected to AND gate 260. Output 262 of channel C is connected to AND gate 264. A programmable address recognition circuit 258 is connected to AND gates 260 and 264, the outputs of which are applied to the input of an OR gate 266. Programmable address recognition circuit 258 selects either channel B or channel C. Programmable address recognition circuit 268 acts as a means for feedforwarding either channel B or C to the input 256 of channel A via AND gate 270 and OR gate 272. A local A input 278 is also connected to OR gate 272. Modulated output A 274 and modulated output B 276 are described in Riley.

Figure 10:
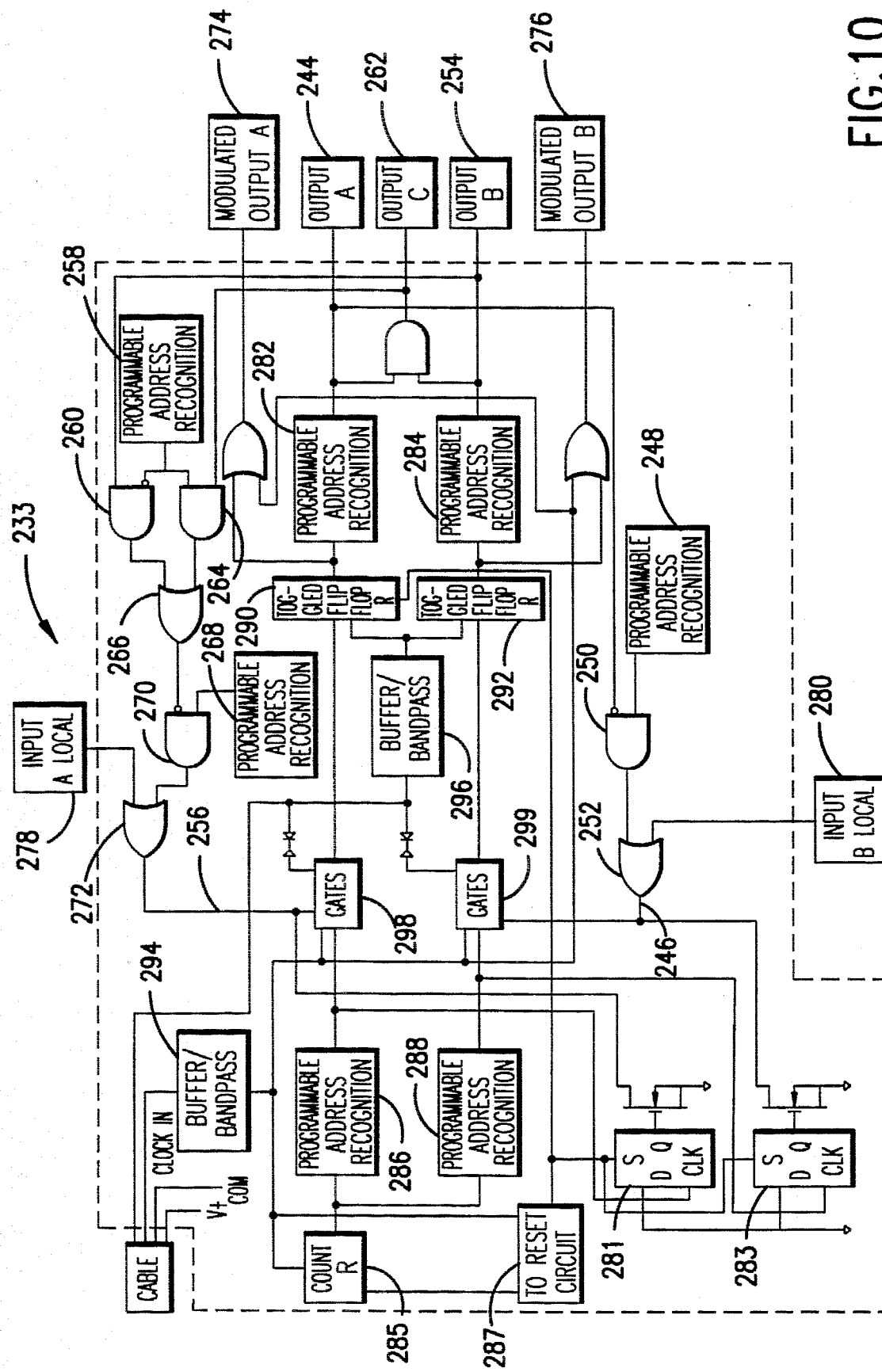
FIG. 10 is a more detailed functional block diagram of the preferred embodiment of the two channel control module of the present invention shown in FIG. 9.

The channels A and B transferring circuits 243 and 245 shown in block form in FIGS. 8 and 9 is shown in greater detail in FIG. 10. The channels A and B transferring circuits contain four programmable address recognition circuits 282, 284, 286 and 288, two toggled flip-flops 290 and 292, two buffer/bandpass circuits 294 and 296, two gates 298 and 299, two flip-flops 281 and 283, counter 285 and reset circuit 287, all of which are described in Riley.

Referring now to FIG. 11, clock signal 350 is produced by the bus clock 84. The time intervals 351 are each one cycle of the clock signal 350. The data pulse 352 is the signal produced by the counter of a control module. There are 256 different possible time intervals 351 in each time frame. FIG. 11 shows portions of two time frames. The input signal 354 is a typical signal appearing on the input terminal of a single-channel control module. The output signal 356 is a typical signal appearing on the output terminal of a single-channel control module. Signals 358 and 360 show alternate signals available on the other output terminal of the invention. Signal 362 appears on the bus.

Figure 12:
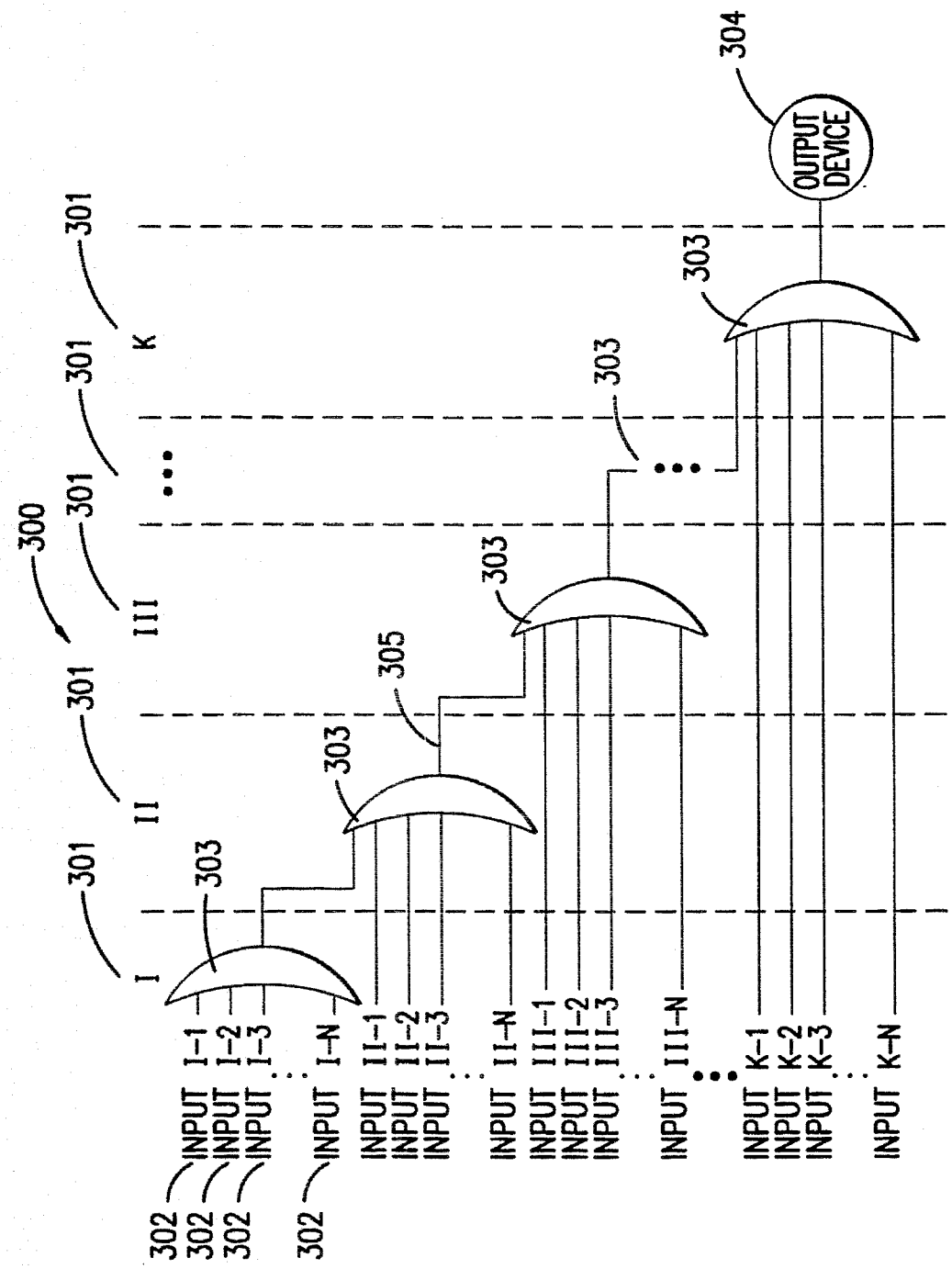
FIG. 12 is a generalized diagram using logic gates to illustrate the K stages or K levels of logic, each level having N-inputs, achievable with the method and control module of the present invention.

Referring now to FIG. 12, the control module, control system, and method of the invention allows control circuits equivalent to a combinational logic circuit 300 having any number, K, stages or levels of logic 301 with each stage or level having any number, N, inputs 302 to be constructed on a serial multiplex bus. The logical gates 303 are shown as OR's but the method allows each gate to be either an OR, AND, NAND, and NOR gate. Only one output device 304 is shown but the method allows for other output devices to be connected at the output of any stage or level such as 305, for example.

While a detailed description of the preferred embodiment of the invention has been given, it should be appreciated that many variations can be made thereto without departing from the scope of the invention as set forth in the appended claims.

I claim:

1. A control system for controlling at least one output device in response to a plurality of signals from input devices, comprising:

a plurality of control modules coupled to a bus, each of the control modules functional as a logical unit;

means for transferring input signals to the bus from the plurality of control modules responsive to said input devices at selected times associated with the control modules;

at least one combinational logical unit formed by feedforwarding an output signal from one of the plurality of control modules associated with one of the selected times to an input terminal of at least one other of the plurality of control modules associated with another of the selected times; and wherein an output of said combinational logic unit is couplable to other of said plurality of control modules to form a multi-level combinational logical control system to control the output device.

2. The control system of claim 1 in which the selected times are a plurality of different time slots of a clock signal associated with the plurality of control modules.

3. The control system of claim 2 in which at least two of the plurality of control modules are associated with one of the plurality of different time slots to form a stage of combinational logic.

4. The control system of claim 3 in which at least two additional control modules are associated with another one of the plurality of different time slots to form another stage of combinational logic.

5. The control system of claim 4 in which another at least two additional control modules are associated with a third time slot to form a third stage of combinational logic.

6. The control system of claim 3 in which at least three additional control modules are associated with another time slot to form another stage of combinational logic with at least three inputs to the other stage.

7. The control system of claim 1 in which the bus is a synchronous time division multiplex bus.

8. The control system of claim 1 in which the bus is a serial bus.

9. The control system of claim 1 in which each of the plurality of control modules has an output terminal for communication with an output device; and another output terminal on which feedforward output signals are produced.

10. The control system of claim 9 including means for selecting whether the feedforward output signal will be provided on the feedforward output terminal.

11. The control system of claim 10 in which the selecting means includes an electrically erasable programable read only memory.

12. The control system of claim 1 in which each of the plurality of the control modules has two channels, each channel associated with a different selected time, each channel having an input terminal, an output terminal and another output terminal.

13. The control system of claim 12 including means for feedforwarding signals from one of the two channels of each control module to the other of the two channels of said control module.

14. The control system of claim 12 including means for feedforwarding signals internally to each control module from one of the channels to the other of the channels of said control module.

15. A method of controlling at least one output device in response to a plurality of input devices, comprising the steps of:

transferring input signals to a bus from a plurality of control modules at selected times associated with the control modules; and feedforwarding an output signal from one of the plurality of control modules associated with one of the selected times to at least one other of the plurality of control modules associated with another of the selected times to control the output device, the output signal being responsive both to the output signal feedforward from the one of the plurality of control modules and to input signals transferred to the bus by the plurality of control modules.

16. The method of claim 15 in which the input signals are single bit, binary signals.

17. The method of claim 15 in which the step of transferring includes transferring input signals from at least two control modules with the same associated time.

18. The method of claim 15 in which the output device is connected to an output of one of the plurality of control modules.

19. The method of claim 15 including the step of using a bus as a wired-OR to produce a resultant output signal from transferred input signals.

20. The control system of claim 1 wherein the means for transferring input signals to the bus includes a transferring circuit in each of the plurality of control modules which receives a signal from an input device associated with a particular control module at the selected time associated with the particular control module and sends that signal to an output terminal, a selective feedforwarding circuit and a terminal for coupling to said bus associated with the particular control module.

21. The control system of claim 1 wherein the control module providing the output signal for controlling the output device is responsive to at least one output signal feedforwarded from another of the plurality of control modules having a different selected time and to the plurality of input signals transferred to the bus by the plurality of control modules.

22. A control system for controlling at least one output device in response to a plurality of signals from input devices, comprising:

a plurality of control modules, each control module having at least one input terminal and being in time division multiplex communication with a serial multiplex bus at a selected time associated with that control module;

at least one transferring circuit within each control module for receiving an input signal from its associated input terminal and transferring that input signal to the serial multiplex bus and to an associated output terminal at the selected time associated with that control module; and means for feedforwarding an output signal from one of the plurality of control modules associated with a selected time to at least one input terminal of at least one other of the plurality of control modules being associated with another selected time, the feedforward output signal of each control module being derived from the transferring circuit of that control module, the output device being controlled by the input signals transferred to the bus by the plurality of control modules and the feedforward output signals.

23. A control module, comprising:

a first channel associated with a selected time slot of a time division serial multiplex bus and having an input terminal for receiving an input signal, an output terminal for providing an output signal, and a transferring circuit for transferring the input signal to the bus and to the output terminal;

a second channel associated with a different selected time slot of the time division serial multiplex bus and having an input terminal for receiving an input signal, an output terminal for providing an output signal and a transferring circuit for transferring the input signal to the bus and to the output terminal;

a feedforward circuit in each of the first and second channels for selectively feedforwarding an output signal from the associated first or second channel to the input of the other of the first or second channels.

24. The control module of claim 23 wherein the feedforward circuit is selectively activated and deactivated by an EEPROM.

25. The control module of claim 23 wherein the feedforwarded output signal from one of the first or second channels is transferred to the bus during the selected time slot associated with the channel to which it has been feedforwarded.

26. The control system of claim 22 wherein each of said control modules further including selected inverter circuits electrically activated, said activation to provide said control modules with one of a plurality of logical functions.

27. The control system of claim 22 wherein one of said control modules receives an input signal associated with a first selected time and feedforwards an output signal to another control module associated with a second selected time to form a combinational logic unit having an output to control the output device.

28. The control system of claim 27 wherein said output of said combinational logic unit is feedforwarded to an input of another control module associated with a third selected time to form a two stage combinational logic unit to control the output device.

29. The control system of claim 28 wherein said output of said combinational logic unit is feedforwarded to an input of another combinational logic unit associated with another selected time to form a multilevel combinational logic unit to control the output device.

30. The control system of claim 14 wherein the means for feedforwarding internally is selectively programable.

31. A control system for controlling at least one output device in response to a plurality of signals from input devices, comprising:

a plurality of control modules, each having a plurality of channels, each channel having an input terminal and being in time division multiplex communication with a serial multiplex bus at a selected time associated with that channel;

a transferring circuit associated with each channel for receiving an input signal from its associated input terminal and transferring that input signal to the serial multiplex bus and to an associated output terminal at the selected time associated with that channel; and means for feedforwarding an output signal from one of the plurality of channels associated with a selected time to at least one input terminal of at least one other of the plurality of channels being associated with another selected time, the feedforward output signal of each channel being derived from the transferring circuit of that channel, the output device being controlled by the input signals transferred to the bus by the plurality of channels of each control module and the feedforward output signals.

* * * * *